United States Patent [19]
Weber et al.

[11] 3,789,209
[45] Jan. 29, 1974

[54] VEHICLE LAMP

[75] Inventors: Bernard R. Weber; David W. Wendt, both of Janesville, Wis.

[73] Assignee: Wesbar Corporation, West Bend, Wis.

[22] Filed: Oct. 25, 1972

[21] Appl. No.: 300,502

[52] U.S. Cl............ 240/7.1 R, 240/8.3, 240/57, 339/119 D, 339/118 R, 340/93, 340/99
[51] Int. Cl............ B60q 1/00, B60q 3/00
[58] Field of Search. 240/7.1 R, 8.3, 57; 339/188 R, 339/119 D; 340/93, 99

[56] References Cited
UNITED STATES PATENTS

| | | | |
|---|---|---|---|
| 3,321,618 | 5/1967 | Goldbaum et al. | 240/8.3 X |
| 3,748,462 | 7/1973 | Newman | 240/57 |
| 2,241,741 | 5/1941 | Schmitt | 240/8.3 |
| 1,614,732 | 1/1927 | Gough | 340/93 |
| 1,631,678 | 6/1927 | Godley | 340/93 |
| 3,255,428 | 6/1966 | Robbins | 339/95 D |
| 3,581,088 | 5/1971 | Magi | 339/188 R |
| 3,691,366 | 9/1972 | Spreuer | 240/8.3 |

Primary Examiner—Joseph F. Peters, Jr.
Assistant Examiner—Richard A. Wintercorn
Attorney, Agent, or Firm—James E. Nilles

[57] ABSTRACT

Two embodiments of vehicle lamps for mounting near the rear corners of vehicles such as trailers are disclosed. Both embodiments comprise a housing having an end wall and a side wall, a double filament bulb mounted inside the housing serving as tail light, stop light and turn signal, a single filament bulb mounted outside the side wall of the housing serving as a side marker light, suitable lenses for each bulb, mounting bolts projecting from the end wall, external connecting means enabling external electrical connections to the unit, an internal connecting means between the two bulbs. The internal connecting means comprise a flexible jumper wire and improved means for securing each end thereof. The external electrical connecting means comprise releasable push-in terminals. Wire harness grooves are provided on the exterior of the end wall. The embodiment for use on the left rear corner of the vehicle includes a license plate bracket and a lens in a hole in the side wall for license plate illumination.

17 Claims, 23 Drawing Figures

3,789,209

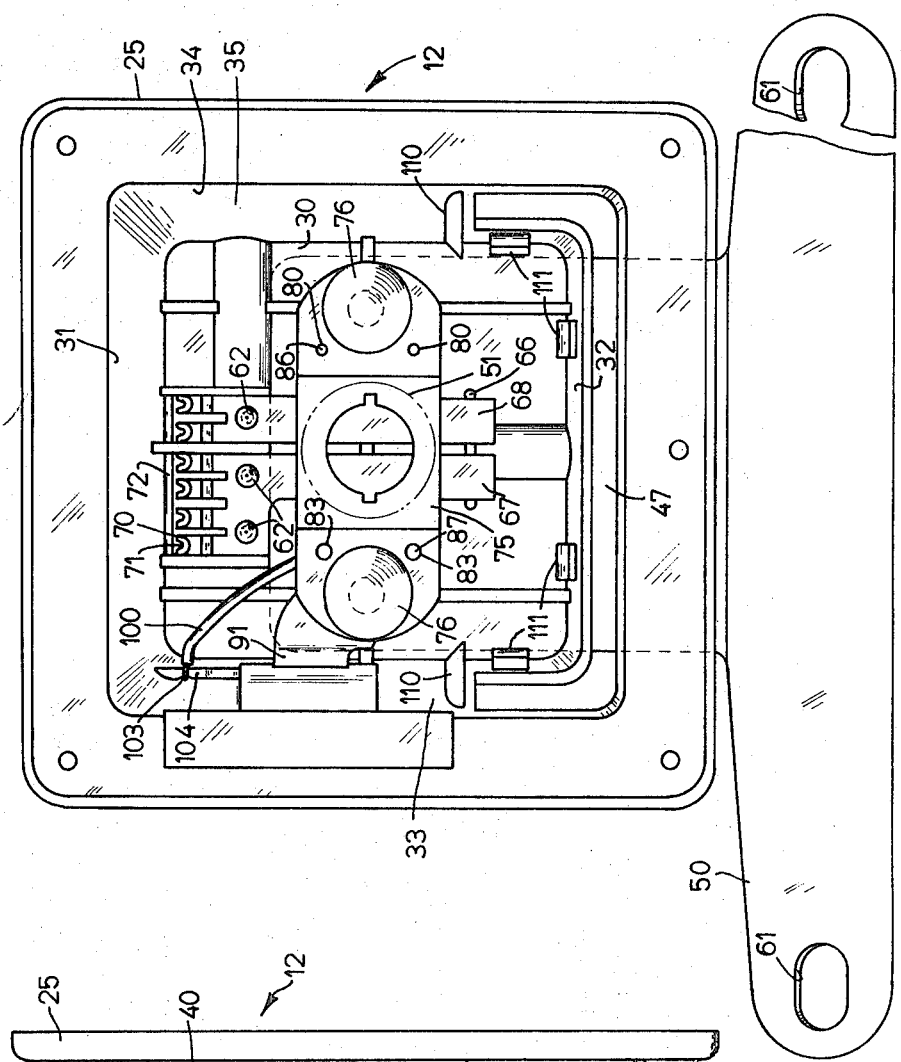
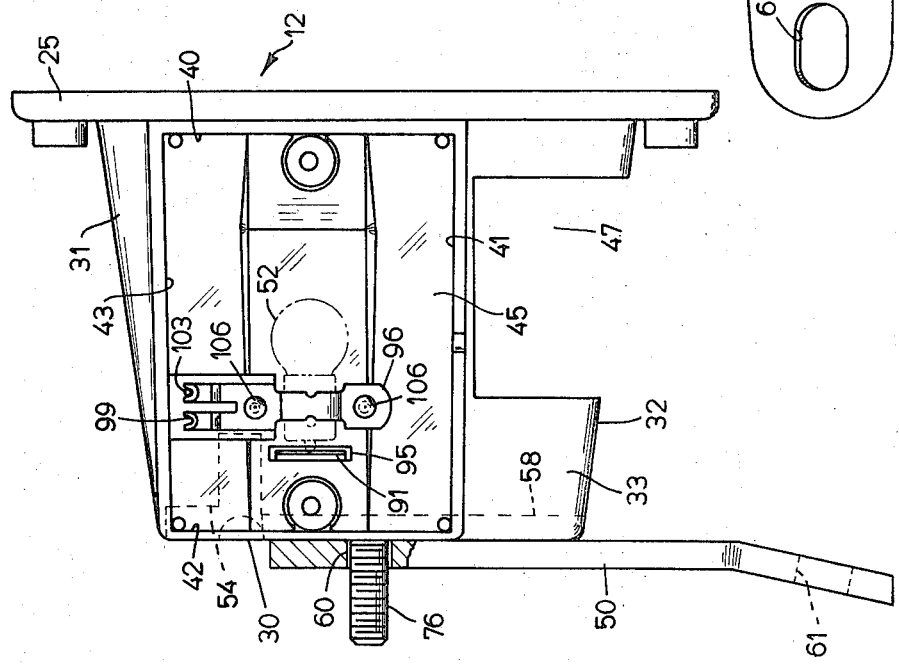

3,789,209

VEHICLE LAMP

BACKGROUND OF THE INVENTION

1. Field of Use

This invention relates to vehicle lamps or light units such as are used, for example, at the left rear and right rear corners of trailers.

2. Description of Prior Art

In order to comply with Federal, State and local regulations and with industry standards, various types of trailers are required to have lamps or light units located at certain positions thereon which function to provide prescribed lighting signals and functions. For example, light units are required at or near the left rear corner and the right rear corner of certain types or sizes of trailers. Each such unit comprises a housing with a double-filament bulb mounted inside which serves as a tail light, stop light and turn signal, and further comprises a single filament bulb on the outside of the housing which serves as a side marker light. A red lens is provided for the double-filament bulb and a separate red lens is provided for the single filament bulb. The unit for use at the left rear corner of the vehicle has a lens hole in the side of the housing and a suitable clear lens in the hole for license plate illumination. In known units of this type, it is the practice to provide a receptacle on the housing to which several leads from the towing vehicle are connected. In some units this receptacle is provided in the rear of the housing and includes push-in terminals. Units of this character also require internal electrical connecting means between the two bulbs and, in some units, these means comprise a rigid ground strap for both bulbs which is grounded to the trailer frame. It also comprises a flexible jumper wire electrically connected between the two bulbs.

SUMMARY OF THE INVENTION

In accordance with the present invention there is provided a lighting unit of the aforesaid character which comprises an improved receptacle at the rear of the housing to facilitate the attachment and release of exterior connecting wires. The lighting unit in accordance with the invention also comprises improved means for connecting the ends of the flexible wire to the two bulbs. More specifically, one end of the flexible wire is provided with an electrically conductive stud which fits in a stud hole inside the housing and is maintained in place by a resilient bulb contact which overlies the stud and is pressed thereagainst by the action of the double-filament bulb. The other end of the flexible wire is adapted to be inserted through a small hole in the housing wall into press-in or frictional engagement with a bulb holder for the single filament bulb. The portion of the housing in which the stud hole is formed has a wire accommodating slot which communicates with the stud hole which is narrower than the diameter of the stud hole to enable the wire to extend therethrough, but to prevent the stud from slipping out during assembly. To facilitate insertion of the other end of the wire into the wire-receiving hole in the housing wall during assembly, guide means are provided for the wire end. Such guide means take the form of a V-shaped groove which is integrally formed in the housing wall so that the wire receiving hole is at the apex of the slot. In further accordance with the invention, there is provided a generally U-shaped connector strap on which the double filament bulb is mounted. Since the double filament bulb is a bayonet-type bulb which is always insertable in a predetermined orientation with respect to the connector strap, means are provided to ensure correct orientation of the connector strap in the housing with respect to a pair of resilient bulb contacts and such means comprise differentially sized holes in the connector strap which engage differentially sized projections integrally formed in the housing. This ensures proper orientation of the connector strap during assembly.

Units in accordance with the invention also are provided with improved means on the exterior end wall of the housing to facilitate attachment of the exterior connecting leads and such means take the form of specially formed grooves in the housing. Light units in accordance with the present invention provide several improvements and advantages over prior art units as regards ease of assembly during manufacture, cost, and simplification of attachment by the user.

DRAWINGS

FIG. 17 is a view of the left rear unit similar to FIG. 5 with the end lens removed;

FIG. 18 is a view of the left rear unit similar to FIG. 2 with the side lens removed;

DESCRIPTION OF PREFERRED EMBODIMENTS

Figure 1A:
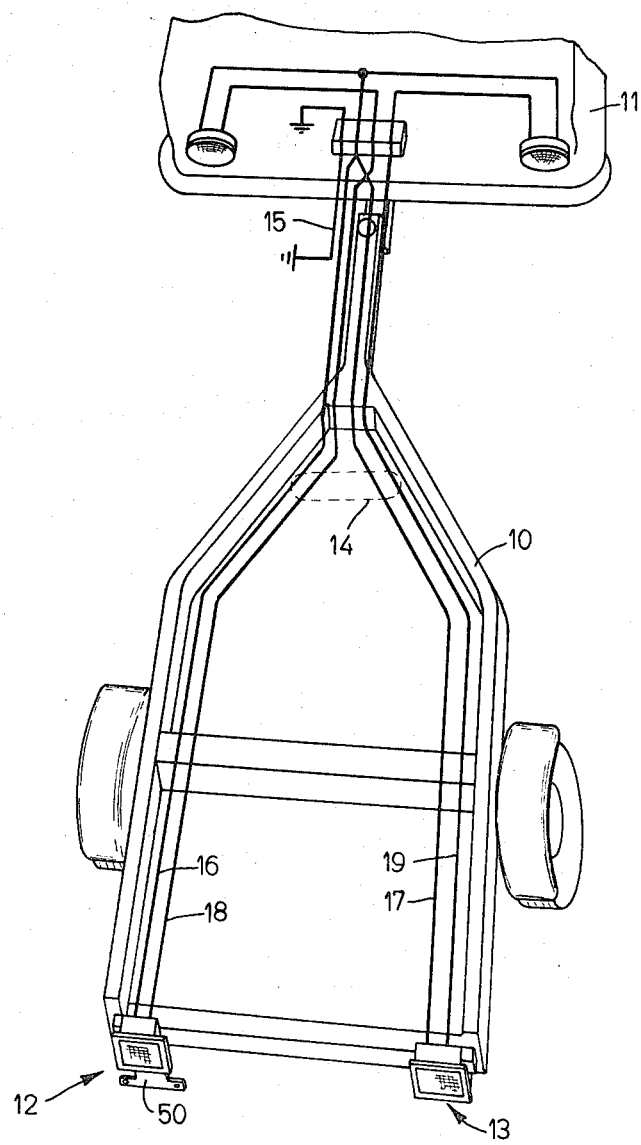
FIG. 1A is a schematic diagram of a trailer employing vehicle lamps in accordance with the invention and of the wiring harness therefor.
Figure 7:
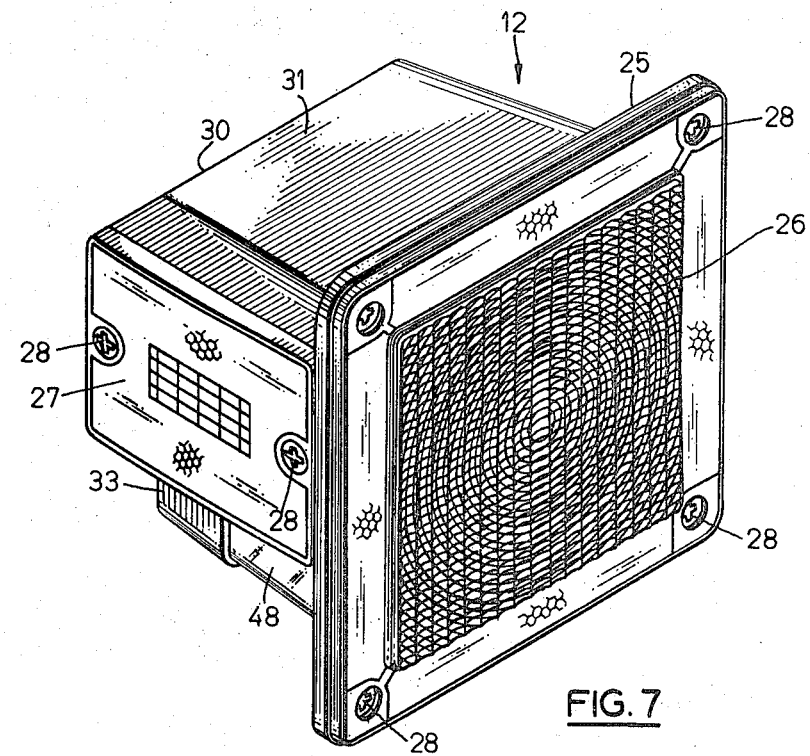
FIG. 7 is a perspective view thereof and taken generally from the left rear side of the unit.

FIG. 1A is a schematic diagram of a trailer 10 which is adapted to be towed by a suitable vehicle such as an automobile 11 and which employs vehicle lamps or light units 12 and 13 in accordance with the invention and a suitable wiring harness 14 for the light units. Unit 12 is a left-hand unit and unit 13 is a right-hand unit for disposition at the left rear corner and the right rear corner, respectively, of the trailer 10. The wiring harness 14 is provided, for example, with a ground lead 15, two tail light feed leads 16 and 17 (left and right), a left-hand unit stop and blink lead 18, and a right-hand unit stop and blink lead 19.

The exterior of left hand unit 12 is shown in detail in FIGS. 1–8. The exterior of right hand unit 13 is shown in detail in FIGS. 9–16. FIGS. 17–22 show details of the interior of left hand lighting unit 12. It is to be understood that right hand lighting unit 13 is similar to left hand unit 12 except as hereinafter noted. Therefore, only the interior of left hand unit 12 will be described in detail hereinafter.

Figure 19:
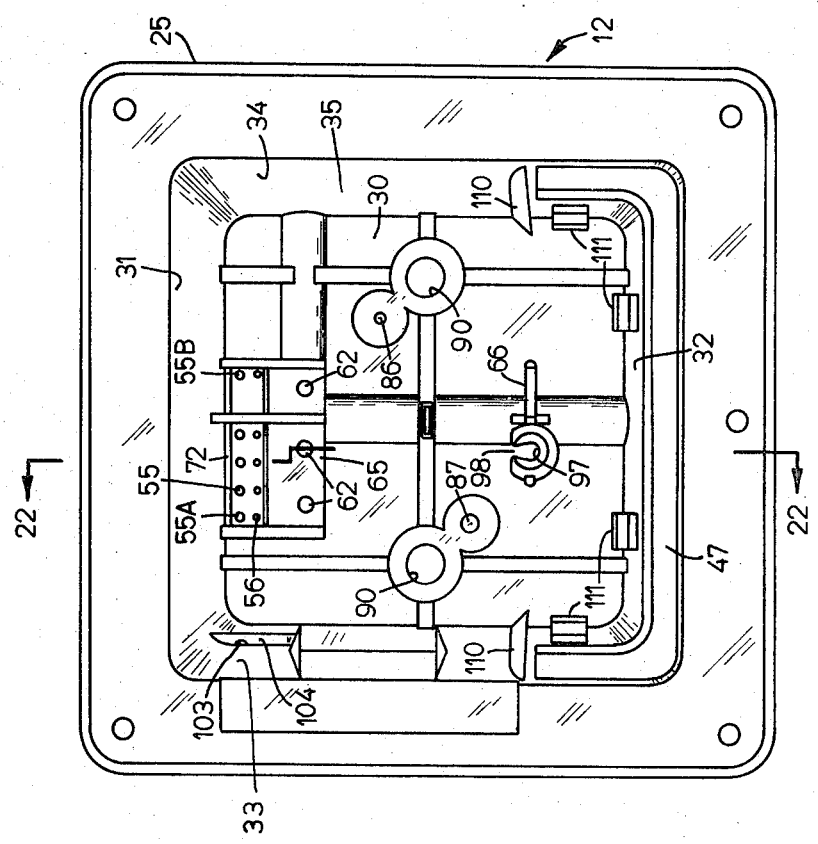
FIG 19 is a view similar to FIG. 17 but with all internal components removed from the housing.
Figure 20:
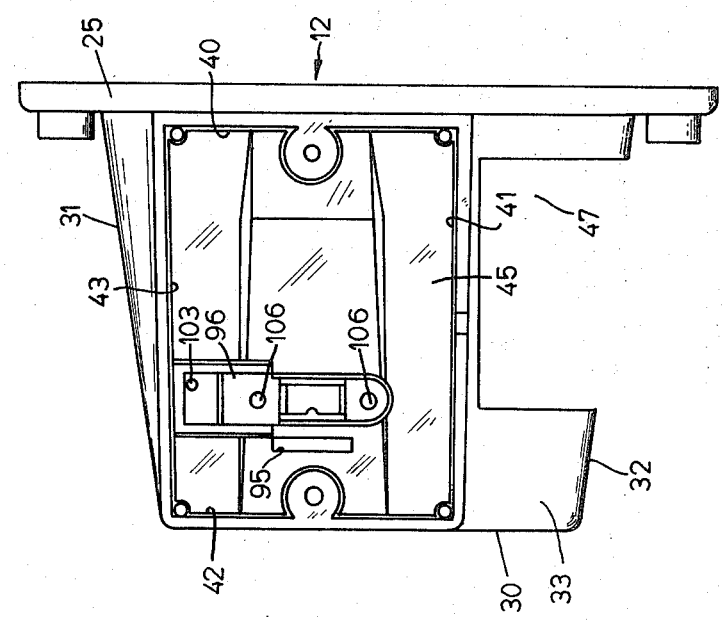
FIG. 20 is a view similar to FIG. 18 but with all internal components removed.

As FIGS. 1–8 show, the left unit 12 comprises a one piece molded plastic housing 25, a molded plastic main lens 26, a molded plastic side lens 27, and suitable fasteners such as screws 28 for securing the lenses to the housing. Housing 25 comprises an end or front wall 30, a top wall 31, a bottom wall 32, a left side wall 33, and a right side wall 34 and these walls cooperate to define a cavity 35 within the housing 25. Left wall 33 is provided on its exterior side with four smaller side walls 40, 41, 42 and 43 (FIG. 18) which cooperate to define a cavity 45 on the exterior of the housing 25. The side walls 33 and 34 and the bottom wall 32 of housing 25 have a cutout or opening 47 wherein which a translucent or transparent, uncolored lens 48 is disposed and this opening 47 is adapted to emit light onto a license plate (not shown) which is understood to be secured to the license plate bracket 50 shown in FIGS. 1A, 18 and 19. As FIGS. 18 and 19 show, a double filament bayonet-type lamp or bulb 51 is located in cavity 35 in a housing 25 and a single bayont-type light bulb or lamp 52 is mounted in cavity 45 on the exterior of housing 25. The double filament bulb 51 serves as a tail light, stop light and turn signal. The single filament bulb 52 serves as a side marker light.

Figure 1:
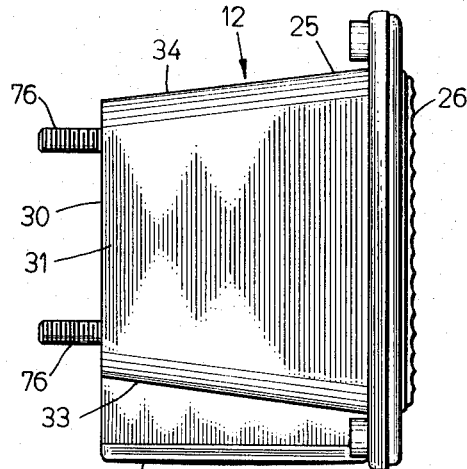
FIG. 1 is a top plan view of a vehicle lamp unit embodying the invention for use at the left rear location on a vehicle.
Figure 4:
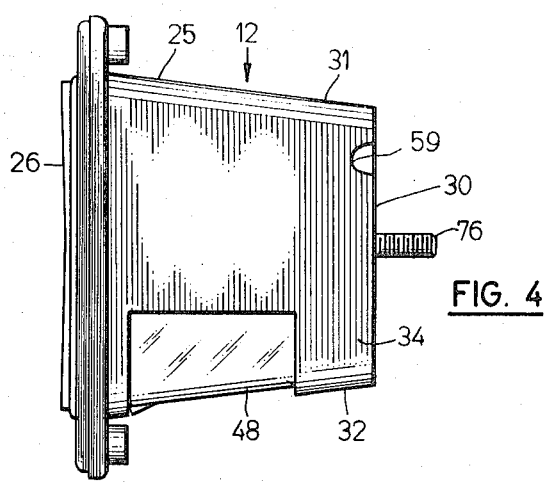
FIG. 4 is a right side view thereof.
Figure 2:
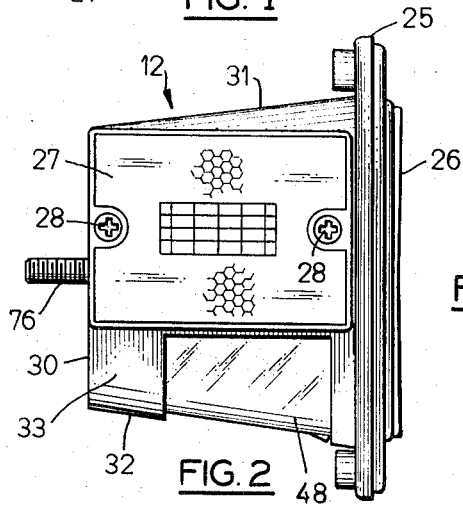
FIG. 2 is a left side view thereof.
Figure 5:
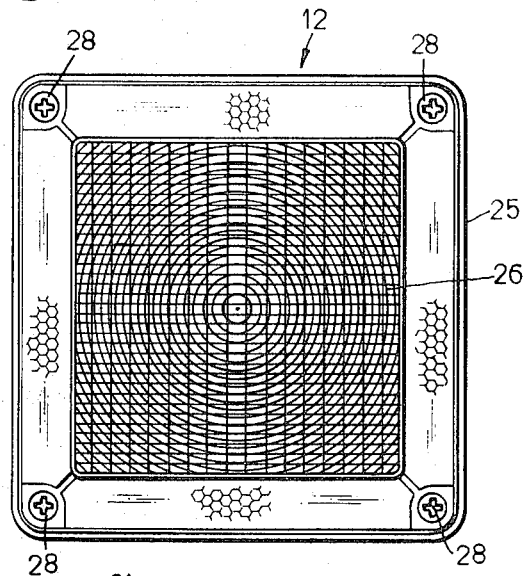
FIG. 5 is a rear view thereof.
Figure 3:
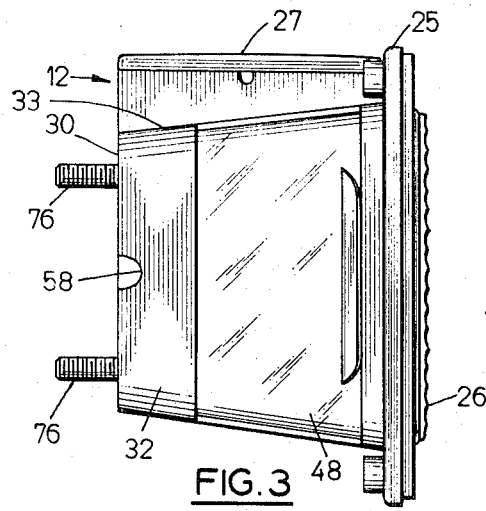
FIG. 3 is a bottom view thereof.
Figure 6:
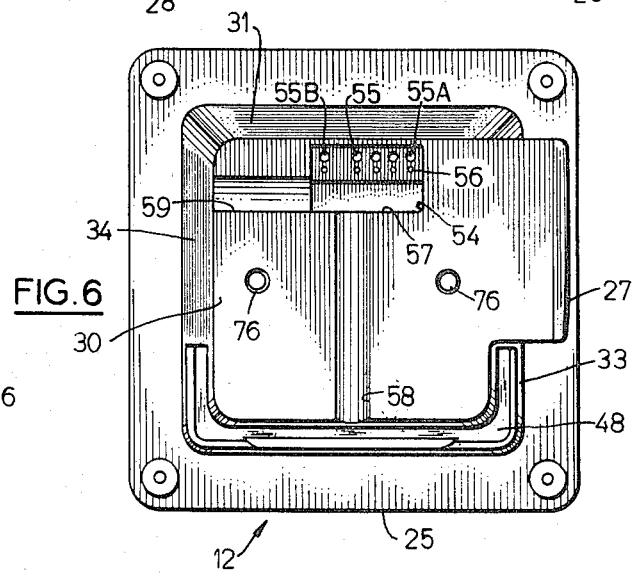
FIG. 6 is a front view thereof.
Figure 8:
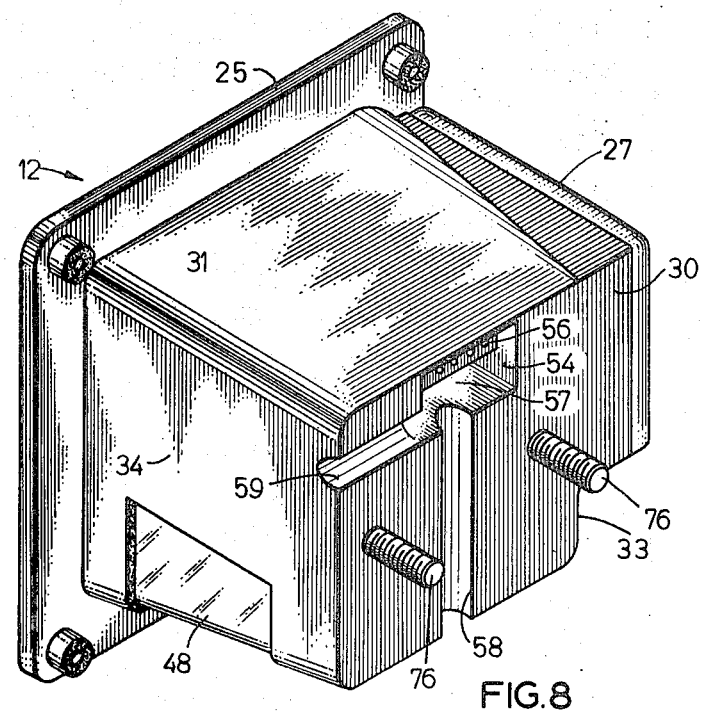
FIG. 8 is a perspective view thereof and taken generally from the right front side of the unit.
Figure 9:
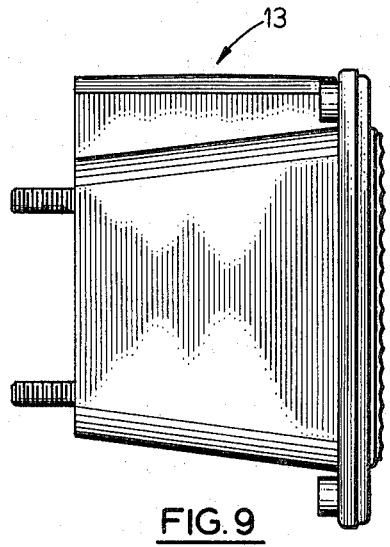
FIG. 9 is a top plan view of a modification of the vehicle lamp unit shown in FIGS. 1 to 8 inclusive for use at the right rear location on a vehicle.
Figure 12:
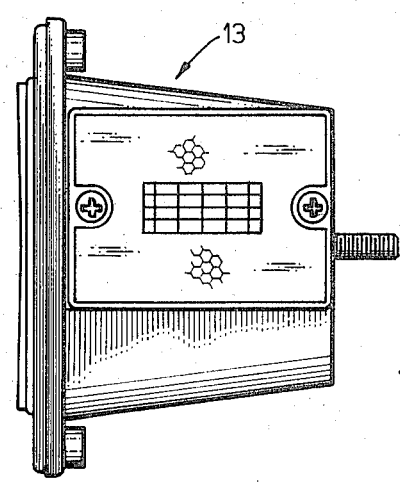
FIG. 12 is a right side view thereof.
Figure 10:
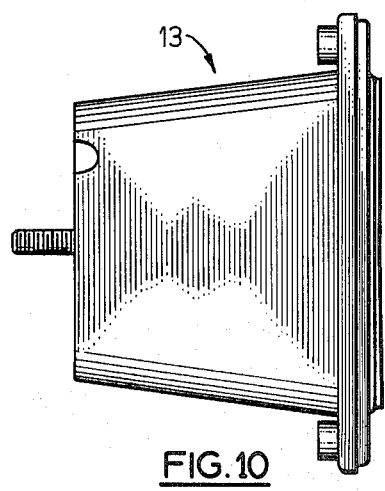
FIG. 10 is a left side view thereof.
Figure 13:
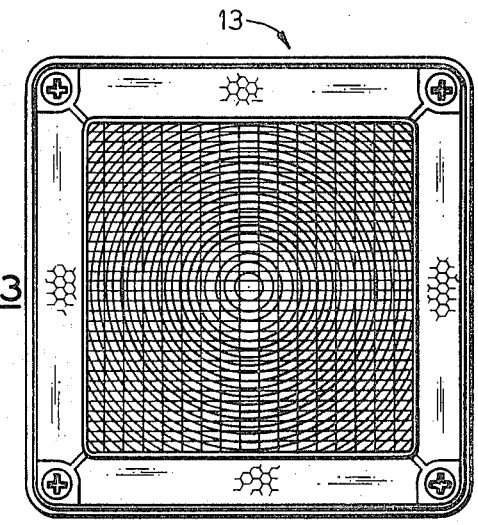
FIG. 13 is a rear side view thereof.
Figure 11:
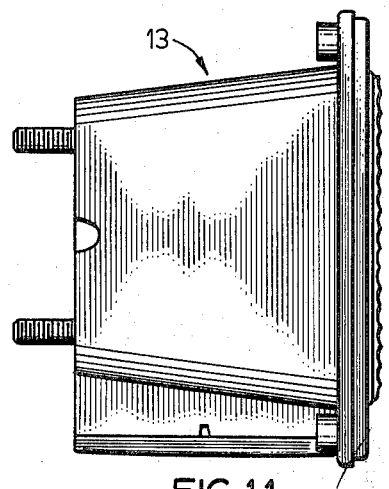
FIG. 11 is a bottom side view thereof.
Figure 14:
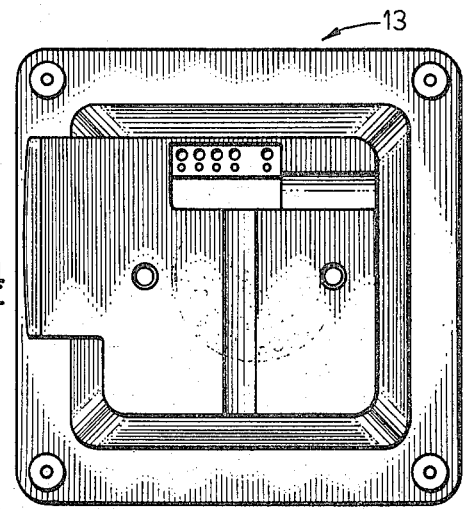
FIG. 14 is a front side view thereof.
Figure 15:
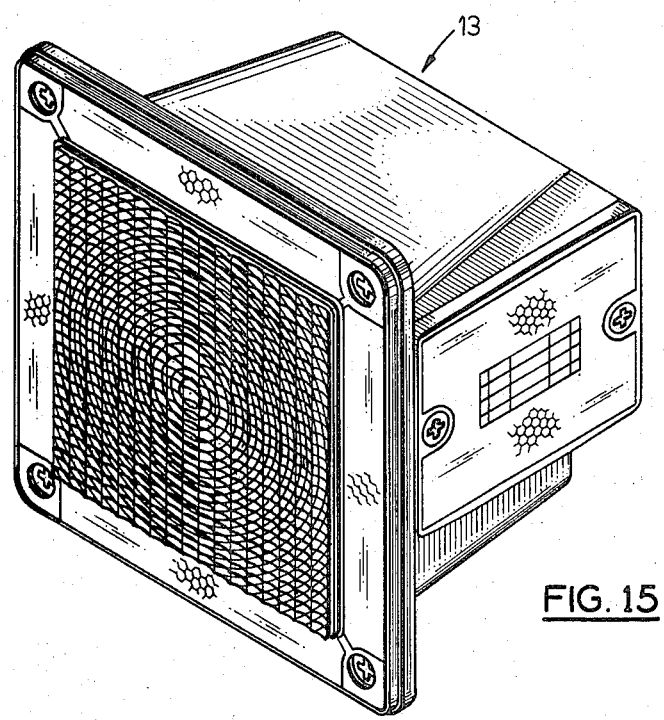
FIG. 15 is a perspective view thereof and taken generally from the right rear side of the unit.
Figure 16:
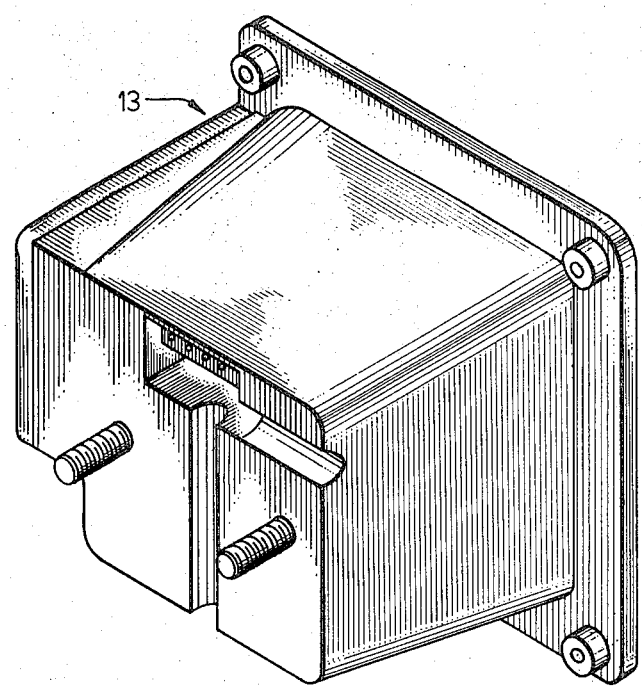
FIG. 16 is a perspective view thereof and taken generally from the left front side of the unit.

As FIGS. 6 and 8 show, the exterior surface of the end wall 30 is provided with a recess 54 and a plurality of wire receiving holes 55 are located in the recess and extend entirely through end wall 30 into communication with cavity 35. It is to be understood for purposes of discussion that the conductors 16 and 18 in the wire harness 14 are insertable through the openings 55A and 55B, respectively. A plurality of wire releasing openings 56 are also provided in recess 54 and are in communication with cavity 35. The recess 54 is enlarged or deepened as at 57 to allow space for some slack of the harness wires 14 at their connection point on housing 25. Transversely disposed grooves 58 and 59 are provided on the exterior surface of end wall 30 and each is in communication with recess 54 and an edge of the end wall. The grooves 58 and 59 provide a space or passage for the harness wires when the lighting unit 12 is secured in place either directly against a surface of the trailer 10 or directly against the license plate holder 50, if the latter is used.

As FIG. 18 shows, the license plate holder 50 has a flat upper portion having two holes 60 therein which is adapted to be secured between end wall 30 and a mounting surface of the trailer 10. Suitable license plate mounting holes 61 are provided in bracket 50.

Figure 21:
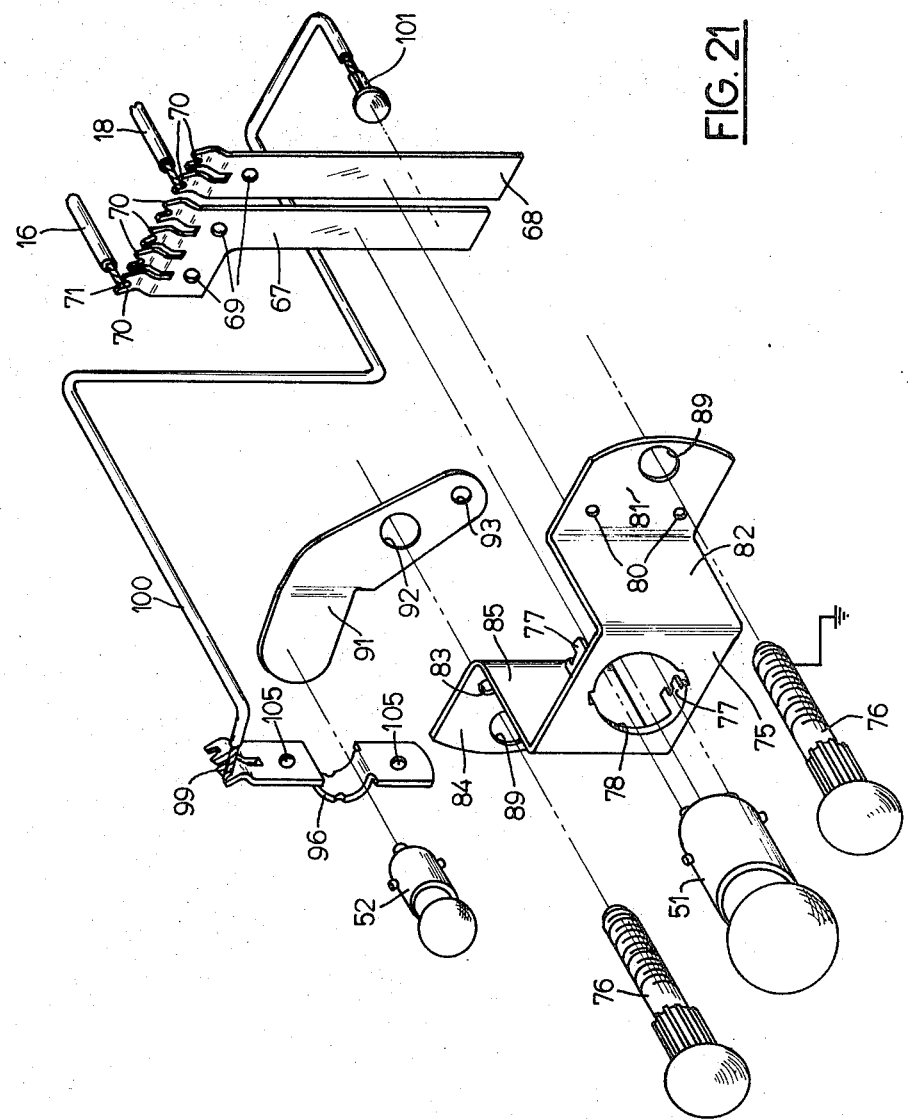
FIG. 21 is an exploded isometric view showing the arrangement and relationship of the internal components of the left rear unit.
Figure 22:
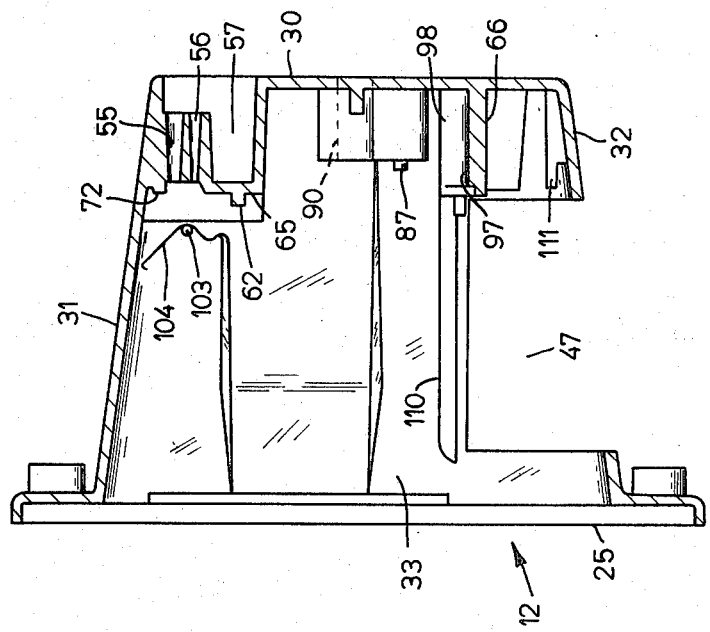
FIG. 22 is an enlarged view taken on line 22—22 of FIG. 19.

Referring to FIGS. 17–21, it is seen that the interior of end wall 30 of housing 25 is provided with first and second integrally formed raised portions or projections 65 and 66. The wire receiving openings 55 extending through the end wall 30 also extend through projection 65. Projection 65 is provided with integrally formed fastening pins or lugs 62 which are deformed as by ultra-sonic welding or other suitable means, as shown in FIG. 17, to secure first and second bulb contacts 67 and 68 in place thereon. As FIG. 21 shows, the contacts 67 and 68 are provided with holes 69 for receiving the lugs 66. The bulb contacts 67 and 68 are preferably formed of electrically conductive, resilient bronze strips which are formed by punching from sheet metal. Contact 68 is provided with two press-in type terminals 70 and contact 67 is provided with four press-in terminals 70. Each press-in terminal 70 has a notch 71 therein which is in alignment with an associated wire receiving opening 55 and is in association with an adjacent abutment 72 integrally formed in housing 25. Therefore, when a bare end of a wire conductor or lead, such as 16 or 18 is inserted through a wire receiving hole 55 it is frictionally engaged between the notch 71 in a press-in terminal 70 and the abutment 72. The wire lead is removable by insertion of a small pin or tool through the appropriate release hole 56 to move the contact strips 67 or 68 to relieve the wedging pressure on the contact on the wire. In the embodiment shown in FIG. 21, only one terminal on each contact 67 and 68 is used and the others serve as auxiliary terminals (not in use) available for other types of harnesses, schemes or other signaling devices not disclosed in the present invention.

The remote ends of the bulb contacts 67 and 68 are supported on the second projection 66 formed in cavity 35 in housing 25. The central portions of the bulb contacts 67 and 68 are, therefore, spaced from the interior surface of end wall 30 and are resiliently movable toward the end wall to allow for insertion of the double filament bulb 51. This resiliency ensures good electrical contact between the bulb terminals and also assists in maintaining the mechanical connection of the bulb.

Double filament bulb 51 is mounted in cavity 35 in housing 25 by means of a U-shaped, bayonet type bulb socket strap 75 which is mounted within the cavity 35 by means of two bolts 76. Strap 72 is polarized by two lugs 77 integrally formed thereon adjacent its bulb accommodating hole 78 to receive bulb 51 only one way in a predetermined position. Therefore, means must be provided to ensure that strap 75 is mounted only one way in a predetermined position with respect to the contacts 67 and 68. Such means, for example, take the form of two holes 80 formed in flange 81 of leg 82 of strap 75 and two larger holes 83 formed in the other flange 84 of leg 85 of strap 75. One of each of the holes 80 and 83 are adapted to engage appropriately sized pins 86 or 87, respectively, which are integrally formed on the inner side of end wall 30. It is to be noted that sets of holes 80 and 83 are provided so that strap 75 is adaptable for use in left hand light unit 12 or right hand light unit 13, because in the units 12 and 13, the contacts 67 and 68 are reversely disposed. The flanges 81 and 84 of strap 75 are provided with bolt receiving openings 89. Proper location and orientation of the bulb socket strap 75 (and thus double filament bulb 51) is necessary to insure that the bulb filament is located at the focal point of the lens.

The bolts 76 are of the press-in type and are adapted for insertion through the bolt holes 89 in the flanges of strap 75 and through two bolt holes 90 formed in end wall 30 of housing 25 to secure the bulb socket strap 75 to the housing and also to hold a ground strap 91 in proper position. Ground strap 91, as FIG. 21 shows, has a bolt receiving hole 92 therein and also has a hole 93 therein which is adapted to receive pin 87 hereinbefore described, which prevents its rotation or displacement. The bolts 76 are grounded when attached to the frame of trailer 10 and also secure lighting unit 12 to the trailer frame or to some appropriate conductive surface thereof. Ground strap 91 extends through a ground strap receiving hole or slot 95 formed in side wall 33 of housing 25 and serves as the base connector for the single filament bulb 52.

As FIGS. 18 and 21 show, bayonet type single filament bulb 52 is held in position in its cavity 45 by a connector strap 96 which is preferably formed by punching from resilient sheet metal. Strap 96 has at least one push-in type wire engaging terminal 99 thereon similar to the terminals 70 hereinbefore described.

The aforesaid second projecting means 66 on end wall 30 has a stud hole 97 therein transverse to end wall 30 which is disposed beneath the resilient contact member 67. This stud hole 97 has a wire-accommodating slot 98 in the side thereof. A flexible wire 100 is provided for electrically connecting contact member 67 to connector strap 96. A contact stud 101 is secured to one end of the wire 100 and has its shank disposed in the aforesaid stud hole 97. The other end of the wire 100 extends through a wire receiving hole 103 in side wall 33 and into engagement with the push-in terminal 99 on connector strap 96 for the side marker light. To facilitate such connection of wire 100 during manufacture, wire guide means are provided on the inner side of side wall 33. The wire guide means takes the form of a V-shaped slot 104 integrally formed by molding in side wall 33 with wire receiving hole 103 at the apex of slot 104. Strap 96 is provided with holes 105 therein which are engageable with ultrasonically deformable pins 106 integrally formed on housing 25 in cavity 45.

The width of slot 98 communicating with stud hole 97 is narrower than the diameter of the stud hole 97. Therefore, wire 100 is able to extend outwardly through slot 98 but stud 101 is unable to slip through the slot during assembly or during use.

It is to be understood that the lighting units 12 and 13 are similar to each other except for the fact that they are mirror images and left hand unit 13 includes license plate lens opening 47, lens 48 and snap-in projecting members 110 and lens stops 111 formed therein which releasably secure the lens 48 in place. Furthermore, units 12 and 13 use the same internal components, except that contact strips 67 and 68 are reverse images in the two units.

RESUME

In accordance with the invention there are disclosed two vehicle lamps or lighting units 12 and 13 for mounting near the left and right rear corners, respectively, of a vehicle, such as a trailer 10. Both lighting units comprise a housing 25 having an end wall 30 and side walls 31, 32, 33 and 34, a double filament bulb 51 mounted inside a cavity 35, the housing 25 serving as a tail light, stop light and turn signal, a single filament bulb 52 mounted in a cavity 45 outside one side wall of the housing serving as a side marker light, suitable lenses 26 and 27 for each bulb 51 and 52, respectively, mounting bolts projecting from the end wall 30, external connecting means enabling external electrical connections to the unit, and internal connecting means between the two bulbs 51 and 52. The internal connecting means comprise a flexible jumper wire 100 and improved means for securing each end thereof, including a push-in terminal 99 and a contact stud 101. The external electrical connecting means comprise releasable push-in terminals. Wire harness grooves 58 and 59 are provided on the exterior of the end wall 30. The embodiment for use on the left rear corner of the vehicle includes a license plate bracket 50 and a lens 48 in a hole 47 in its bottom wall 32 (and portions of side walls 30 and 33) for license plate illumination.

More specifically, each lighting unit 12 and 13 comprises a housing 25 having an end wall 30, side walls 33 and 34, an end lens 26 and a side lens 27. The end wall 30 has first and second integrally formed projecting means 65 and 66 on the inside thereof and also has two bolt holes 90 therethrough. The side wall on which the side marker light is located has a ground strap receiving hole 95 therethrough and also has a wire receiving hole 103 therethrough.

First and second resilient bulb contact members 67 and 68 are located within the housing 25 and each contact member is attached near one end thereof to the aforesaid first projecting means 65. Each contact member is provided near the said one end thereof with at least one, but preferably several, releasable push-in type wire engaging terminals 70. The rear wall is provided with one wire-receiving opening 55 for access to each of the push-in terminals 70 on the contact members 67 and 68. The end wall 30 is also provided with one wire-releasing opening 56 adjacent each wire-receiving opening 55.

A U-shaped bayonet-type bulb socket strap 75 is mounted within the housing 25 and has an outwardly projecting flange 81 and 84, on each leg 82 and 85, respectively, thereof. This strap 75 is polarized (by lugs 77 integrally formed thereon adjacent its bulb hole 78) to receive bayonet-type double filament bulb 51 in a predetermined position or orientation. Each flange 81, 84 has a bolt-receiving opening or hole 89 therethrough. Press-in type bolts 76 are provided for insertion through the bolt holes 89 in the flanges and through the bolt holes 90 in the end wall 30 to secure the bulb socket strap 75 to the housing 25. These bolts 76 are grounded when attached to the vehicle frame to secure the lighting unit thereto. A ground strap 91 is secured to one of the bolts 76 and extends through a ground strap hole 94 in the side wall. Each bulb socket strap flange 81, 84 has two orientation holes therein and the orientation holes 83 in flange 84 are larger than the holes 80 in the other flange 81. Orientation pins 86 and 87 integrally formed on the inside of end wall 30 (and appropriately sized) cooperatively engage the orientation holes 80 and 83, respectively, in the strap flanges to insure proper electrical orientation of the bulb socket straps during assembly.

The aforesaid second projecting means 66 on the inside of the end wall 30 has a stud hole 97 therein transverse to the end wall 30, which stud hole 97 is disposed neneath the resilient contact member 67. This stud hole 97 has a wire-accommodating slot 98 in a side thereof. A bayonet-type bulb connector strap 96 for holding bayonet-type single filament bulb 52 is secured to the housing 25 on the exterior of said wall 33 in a cavity 45. This connector strap 96 is provided near one end thereof with at least one push-in type wire engaging terminal 99. A flexible wire 100 is provided for electrically connecting the aforesaid resilient contact member 67 to the connector strap 96. A contact stud 101 is secured to one end of the wire 100 and is disposed in the aforesaid stud hole 97. The other end of the wire 100 extends through the wire receiving hole 103 in the side wall 33 and into engagement with the push-in type wire engaging terminal 99 on the connector strap 96 for the side marker light. To facilitate such connection of the said other end of the wire 100 during manufacture, wire guide means are provided on the inner side of side wall 33. The wire guide means takes the form of a V-shaped slot 104.

The external electrical connecting means comprise a recess 54 in the exterior of end wall 30 which has a base surface in which the aforesaid wire-receiving holes 55 and wire releasing holes 56 are provided. Furthermore, two transversely disposed wire harness accommodating grooves 58 and 59 are molded on the exterior of end wall 30 and are in communication with the recess 54 and an edge of end wall 30.

A license plate holder 50 is secured to the exterior of end wall 30 of left rear unit 12 by the press-in bolts 76 and overlies at least one of the wire harness grooves 58 and 59. In addition, in the left rear unit 12, the bottom wall 32 is provided with a lens-receiving opening 47 and a translucent (clear) lens 48 is removably mounted in this lens-receiving opening. This lens-receiving opening 47 is located so as to enable illumination of a license plate on the license plate holder 50 from the bulb 51 within the housing 25.

We claim:

1. In a lighting unit for attachment to a vehicle:
a housing comprising an end wall and a side wall,
said end wall having first and second projecting means on the inside thereof,
said side wall having a wire receiving hole therethrough,
at least one resilient bulb contact member having one end attached to said first projecting means,
a bulb socket strap secured within said housing,
said second projecting means on said end wall having a stud hole therein transverse to said end wall and disposed beneath said contact member, said stud hole having a wire accommodating slot in a side thereof,
a bulb connector strap mounted on the exterior of said side wall of said housing,
said connector strap cooperating with a portion of said housing near one end thereof to define a push-in type wire engaging terminal for an end of a flexible wire,
a flexible wire for electrically connecting said contact member to said connector strap,
and a contact stud secured to one end of said wire and disposed in said hole in said second projecting means on said end wall,
the other end of said wire extending through said wire receiving hole in said side wall into engagement with said push-in type wire engaging terminal on said connector strap.

2. A unit according to claim 1 wherein said wire-accommodating slot is narrower than the diameter of said stud hole.

3. A unit according to claim 2 including wire guide means provided on the inner side of said side wall.

4. In a lighting unit for attachment to a vehicle:
a housing comprising an end wall and a side wall,
said end wall having first and second projecting means on the inside thereof and having at least one bolt hole therethrough,
said side wall having a ground strap receiving hole therethrough and also having a wire receiving hole therethrough,
first and second resilient bulb contact members,
each contact member attached near one end thereof to said first projecting means,
each contact member being provided near said one end thereof with at least one releasable push-in type wire engaging terminal,
said rear wall being provided with one wire-receiving opening for access to each of said terminals,
said end wall also being provided with one wire-releasing opening adjacent each wire-receiving opening,
a U-shaped bayonet-type bulb socket strap having at least one flange on a leg thereof, said strap being polarized to receive a bayonet-type double filament bulb in a predetermined position,
one of said flanges having a bolt-receiving opening therethrough,
a press-in type bolt for insertion through said bolt hole in said flange and said bolt hole in said end wall to secure the bulb socket strap to said housing, a ground strap secured to said bolt and extending through said ground strap hole in said side wall,
each of said flanges of said bulb socket strap having an orientation hole therein, one of said orientation holes being larger than the other,
orientation pins on said end wall to cooperatively engage said orientation holes, one of said orientation pins being larger than the other,
said second projecting means on said end wall having a stud hole therein transverse to said end wall and disposed beneath one of said contact members, said stud hole having a wire-accommodating slot in a side thereof,
a bayonet-type bulb connector strap secured to said housing on the exterior of said side wall,
said connector strap being provided near one end thereof with at least one push-in type wire engaging terminal,
a flexible wire for electrically connecting one of said contact members to said connector strap,
and a contact stud secured to one end of said wire and disposed in said hole in said second projecting means on said end wall,
the other end of said wire extending through said wire receiving hole in said side wall into engagement with said push-in type wire engaging terminal on said connector strap.

5. A unit according to claim 4 including wire guide means provided on the inner side of said side wall.

6. A unit according to claim 4 including a recess in the exterior of said end wall having a surface in which said wire-receiving and wire releasing holes are provided.

7. A unit according to claim 4 including at least one wire harness accommodating groove on the exterior of said end wall in communication with said recess.

8. A unit according to claim 7 including two transversely disposed grooves on the exterior of said end wall, each in communication with said recess.

9. A unit according to claim 8 including a license plate holder secured to the exterior of said end wall by said press-in type bolt and overlying at least one of said grooves.

10. A unit according to claim 9 wherein said side wall is provided with a lens receiving opening and a translucent lens removably mounted in said lens receiving opening, said lens receiving opening being located so as to enable illumination of a license plate on said license plate holder from a light source within said housing.

11. In a lighting unit: a housing have a wall; first and second electrically conductive members mounted inside of and outside of said housing, respectively, said second member outside of said housing cooperating with a portion of said housing to define a push-in terminal for one bare end of a flexible wire disposed within said housing for electrically connecting said first and second members, said wall having a wire receiving opening therethrough for accommodating said one bare end of said wire, and wire guide means on the inside of said wall adjacent said opening for guiding said one bare end of said wire into said opening from inside of said housing.

12. A unit according to claim 11 wherein said wire guide means comprises a recess formed in said housing and having an apex with said wire receiving opening located near said apex.

13. A unit according to claim 12 wherein said recess is formed in a projection on the inner surface of said wall.

14. In combination: a lighting unit for mounting on a surface of a vehicle, said lighting unit comprising a housing having a wall, said wall having a recess on the exterior thereof and at least one wire accommodating groove on the exterior of said wall communicating between said recess and the edge of said wall, and a license plate holder having a portion disposed between said wall of said housing and said surface of said vehicle, said portion overlying said groove.

15. A unit according to claim 14 including attachment means projecting from said wall for securing said unit to said surface of said vehicle and wherein said portion of said license plate holder includes a hole therethrough for accommodating said attachment means.

16. A unit according to claim 15 including two transversely disposed grooves on the exterior of said wall, each groove communicating with said recess and an edge of said wall.

17. A unit according to claim 16 wherein said wall is an end wall and further including a side wall for said housing,
    said side wall being provided with a light emitting opening therethrough in the vicinity of said license plate holder and a translucent lens for said light emitting opening.

* * * * *